(12) United States Patent
Zemany et al.

(10) Patent No.: US 7,528,764 B2
(45) Date of Patent: May 5, 2009

(54) THROUGH THE WALL RANGING WITH TRIANGULATION USING MULTIPLE SPACED APART RADARS

(75) Inventors: Paul D. Zemany, Amherst, NH (US); Eldon M. Sutphin, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 12/006,120

(22) Filed: Dec. 31, 2007

(65) Prior Publication Data

US 2008/0111729 A1 May 15, 2008

Related U.S. Application Data

(63) Continuation-in-part of application No. 11/121,787, filed on May 3, 2005, now Pat. No. 7,355,545, which is a continuation-in-part of application No. PCT/US2004/036446, filed on Nov. 2, 2004, which is a continuation-in-part of application No. PCT/US2004/030116, filed on Sep. 14, 2004.

(51) Int. Cl.
*G01S 13/00* (2006.01)
*G08G 1/16* (2006.01)

(52) U.S. Cl. ............................ 342/22; 342/28; 701/301

(58) Field of Classification Search .................. 342/28, 342/22; 701/301
See application file for complete search history.

(56) References Cited

U.S. PATENT DOCUMENTS

| | | | | | |
|---|---|---|---|---|---|
| 3,795,911 | A | * | 3/1974 | Hammack | 342/106 |
| 3,832,709 | A | * | 8/1974 | Klein et al. | 342/127 |
| 5,440,208 | A | * | 8/1995 | Uskali et al. | 315/169.3 |
| 6,085,151 | A | * | 7/2000 | Farmer et al. | 701/301 |
| 6,295,020 | B1 | * | 9/2001 | Koechlin | 342/175 |
| 6,426,716 | B1 | * | 7/2002 | McEwan | 342/28 |
| 6,469,656 | B1 | * | 10/2002 | Wagner et al. | 342/70 |
| 6,492,933 | B1 | * | 12/2002 | McEwan | 342/28 |
| 6,753,803 | B2 | * | 6/2004 | Szajnowski | 342/62 |
| 6,961,423 | B2 | * | 11/2005 | Pessoa et al. | 379/406.08 |
| 7,013,991 | B2 | * | 3/2006 | Wilson-Langman et al. | 175/48 |
| 2002/0060639 | A1 | * | 5/2002 | Harman | 342/28 |
| 2004/0151067 | A1 | * | 8/2004 | Szajnowski | 367/90 |
| 2006/0109170 | A1 | * | 5/2006 | Voigtlaender et al. | 342/82 |
| 2006/0250294 | A1 | * | 11/2006 | Zemany et al. | 342/22 |

* cited by examiner

*Primary Examiner*—Thomas H Tarcza
*Assistant Examiner*—Harry Liu
(74) *Attorney, Agent, or Firm*—Robert K. Tendler

(57) ABSTRACT

A plurality of multi-tone CW radars are used to generate a swath of ranges to a moving object or individual behind a wall or building structure in which the overlap of the range swaths from spaced-apart radars determines the location of the moving object or individual. A histogram of the swath overlaps is used to generate a display of the path of the moving object or individual.

20 Claims, 6 Drawing Sheets

THROUGH THE WALL RANGING WITH TRIANGULATION USING MULTIPLE SPACED APART RADARS

RELATED APPLICATIONS

This application is a continuation-in-part of U.S. patent application Ser. No. 11/121,787, filed May 3, 2005, now U.S. Pat. No. 7,355,545 entitled Through the Wall Ranging With Triangulation Using Multiple Spaced Apart Radars, which is a continuation-in-part of PCT Patent Application Serial No. US2004/036446 filed Nov. 2, 2004, entitled Dual Frequency Through-the-wall Motion Detection and Ranging Using Difference-Based Estimation Technique, which is a continuation-in-part of U.S. Patent Application Serial No. PCT/US04/30116 filed Sep. 14, 2004, the contents of which are incorporated herein by reference.

FIELD OF THE INVENTION

This invention relates to through-the-wall sensors and more particularly to the use of multiple two-tone CW radars to triangulate on the position of moving objects behind a wall.

BACKGROUND OF THE INVENTION

As described in PCT Patent Application Serial No. US2004/036446 filed Nov. 2, 2004 entitled Dual Frequency Through-the-wall Motion Detection and Ranging Using Difference-Based Estimation Technique, invented by Paul Zemany and Eldon Sutphin, it is possible using two-tone CW radars to obtain the range to a moving object behind a wall or other structure, even when the object is executing a random motion. This system is a model-based system in which the phase difference between the returned versus transmitted energy for the first tone and the second tone result in two waveforms, each permitting specifying the temporal phase difference between the two respective tones. Range to a randomly moving object is accomplished by comparing data associated with real-time returns to templates, using a matching algorithm to determine range. Part of the matching includes a predictor that predicts from one waveform corresponding to the phase difference for a first tone the waveform phase difference for the second tone. This system is described in detail hereinafter.

The result is that for a single two-tone radar, one can develop a swath corresponding to possible range of the individual or moving object to the single radar.

While such range determinations from a single radar are useful to determine the range of a moving individual from an individual radar, it is more desirable to be able to pinpoint the location of the individual as opposed to determining his or her range.

Range, of course, determines how far the individual is from the single radar so that, for instance, firemen can know how far into a burning building an individual is. This provides a first baseline of information as to where to search for the individual.

It does not, however, pinpoint the individual, but rather locates the individual on an arc or swath having the single radar as its focus.

By way of further background, as described in PCT Patent Application PCT/US04/30116 filed Sep. 14, 2004 by Paul Zemany and Eldon Sutphin, a system is described for projecting continuous wave radar energy through a wall to be able to detect motion of persons behind the wall. In this system, motion is detected by a change in the phase difference between the transmitted wave and the received wave, which is sensitive in detecting motion.

However, the use of a single frequency radar does not permit the detection of range to the moving individual and may provide less-than-adequate information to individuals, for instance when trying to detect the whereabouts of a moving individual behind a wall.

As described in the afore-mentioned patent application by Zemany and Sutphin, detecting motion behind a wall is extremely useful in both civilian and military applications. For instance, locating the whereabouts of a down firefighter in a burning building is of consequence for firefighters, whereas detecting the position of an individual behind a wall may be of significant interest to military forces seeking to capture or remove the individual from being a threat.

Moreover, knowing not only that the motion has occurred but also range, one can estimate what it will take to provide personnel to rescue, for instance, an individual within a burning building. Range also is important to be able to ascertain where a wanted individual is so that the individual can be captured.

It will be appreciated that in the past, ultra wideband devices have been used as ground-penetrating and through-the-wall radars. The difficulty with ultra wideband approaches is that one has to generate short pulses, which requires fairly expensive hardware. A particular difficulty with ultra wideband is that walls have frequency-dependent attenuation. This results in a distortion of the return pulses that pass through the wall. This distortion blurs the pulse, making it hard to correlate. Moreover, in ultra wideband applications, one must integrate over multiple pulses in order to obtain enough processing gain to detect objects inside a building. In this regard, in ultra wideband systems, one has to generate a stream of pulses. The problem with generating streams of pulses is the existence of clutter and with an ultra wideband pulsed radar, one detects everything within a room. One therefore has to have a means for discriminating clutter from background, which ultra wideband systems do not do.

As will be appreciated, what is therefore described in the above continuation-in-part application is an easily portable, low cost, low power drain, compact unit that can be positioned outside a building and that can detect motion of individuals within the building, discriminate against non-moving inanimate objects and at the same time provide range to the detected moving object.

SUMMARY OF INVENTION

Using the aforementioned multiple-tone radar, it has been found that one can accurately triangulate on a moving individual when placing multiple multi-tone radars about a surveyed area such as in a building or behind a wall or other obstruction. The results of each of the radars are coupled to an overlap detector that detects the overlap in the locus of ranges from each of the multiple multi-tone radars. A histogram of the overlaps is used to generate a display of the path of the moving object or individual so that the track or movement of the individual behind the wall may be ascertained as well as his or her instantaneous position.

BRIEF DESCRIPTION OF THE DRAWINGS

These and other features of the subject invention will be better understood in connection with a Detailed Description, in conjunction with the Drawings, of which.

DETAILED DESCRIPTION

Multi-tone CW Radar

Figure 1:
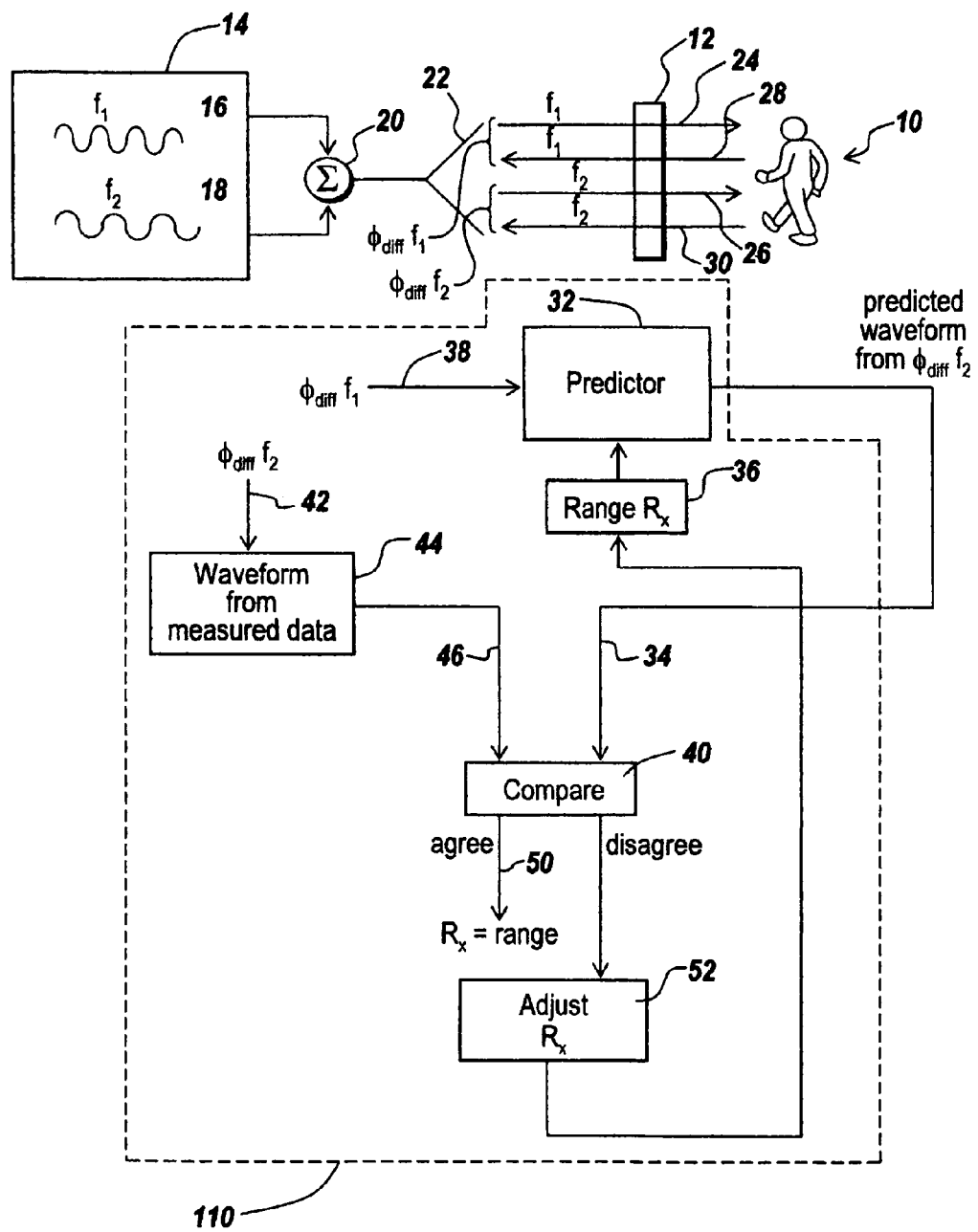
FIG. 1 is a diagrammatic illustration of the range detection system used in the subject invention in which the range to a moving object behind a wall is detected by projecting two-toned continuous waves through the wall and detecting the phase difference between outgoing and incoming waves for each of the two tones, with the phase difference signal for one frequency being applied to a predictor to generate a predicted waveform for the phase difference of the second of the two tones, with the predicted waveform being compared with a waveform derived from measured data such that when the two waveforms compare favorably, the range associated with the matched waveform is the declared range.

To describe the operation of the multi-tone CW radar used in the subject invention, it was found that for an object exhibiting constant motion or velocity the phase shift between the two waveforms representing the phase difference between transmitted and returned waves for the two tones or frequencies is directly related to range. This is because comparing waveforms corresponding to the phase difference between the outgoing and incoming waves at the two frequencies results in a relationship between the phase shift between the two waveforms and range. For instance, at zero range there is no difference in phase between the two waveforms. At a range equal to $\lambda/4$ one has a 180° phase shift between the two waveforms. In between, for constant motion objects there is a linear relationship between phase shift and range such that by measuring phase shift between the two waveforms one can deduce range. Here $\lambda$ is the wavelength associated with the difference in $f_1$ and $f_2$, or in this case one megahertz.

However, in reality individuals rarely maintain a constant velocity and it can be shown that the subject system can measure range to objects having a pseudo-random motion.

In order to determine range for random motion, the two-tone CW radar used for constant motion is used to drive a single antenna. Here continuous waves at the two frequencies $f_1$ and $f_2$ are simultaneously applied to the antenna. The system measures the phase difference between the returned versus transmitted energy for the first tone, $f_1$ and the second tone, $f_2$. This results in two waveforms each specifying the temporal phase difference for the two respective tones. In the constant motion case, the phase shift between these two waveforms indicates the range from the antenna to the moving object.

In order to accommodate the usual situation in which the object's motion varies over time, a model-based signal processing algorithm extracts range by comparing the waveform corresponding to the time sequence of phase differences for the detected returns at one of the frequencies with the predicted waveforms corresponding to the predicted phase differences for the other frequency at a number of ranges, with the waveform closest to that which is detected being declared as the range to the moving object.

Due to the use of a model-based system, movement is not limited to constant velocity or to large movements compared to the carrier wavelength, meaning that even slight hand movement can be sensed.

The model is populated by selecting the first and second tones and setting their frequencies apart by for instance one MHz. For one frequency, $f_1$, one samples the mixer output used to provide a signal corresponding to the phase difference between outgoing and incoming energy. The output of the mixer thus produces a time sequence waveform corresponding to the phase difference between outgoing and incoming waves at $f_1$. This $\varnothing_{diff} f_1$ waveform is used by a predictor involving a mathematical model that predicts the time sequence waveform for $f_2$ based on information from $f_1$ for an a specific range value. The other input to the predictor is range. The model is built up in terms of generating stored waveform templates by sequencing through a number of ranges to produce a set of range-dependant templates, each keyed to a given range. The time sequence waveform for $f_2$ corresponding to the phase difference between outgoing and incoming waves from real-time data is then compared to the predicted time sequence waveform for $f_2$ to ascertain which template and thus which range offers the best fit. Optimal search methods can be employed to obtain the range value (R) that gives the best fit.

Thus, it is possible to determine range to the motion even if the motion is not constant or the target moves only a fraction of the carrier wavelength.

For random motion, the system provides not only an indication of the existence of an individual but also determines the range to the individual by first developing range templates or using an iterative search to find the best range value, and by comparing the data associated with real-time returns to the templates, with a matching algorithm determining range.

The range templates in one embodiment are generated by a predictor that predicts from one waveform corresponding to the phase differences for the first tone, namely $f_1$, the predicted phase differences for the second tone.

The predictor algorithm is based on using the time domain signal or temporal waveform corresponding to the temporal phase difference between outgoing and reflected energy at $f_1$ available from a mixer for $f_1$ to predict the temporal phase difference waveform between outgoing and reflected energy at $f_2$ available as a signal produced by a mixer for $f_2$. To describe this the following are defined:

$k_1 = 2\pi/\lambda_1$  Equation 1

$k_2 = 2\pi/\lambda_2 = k_1 + \Delta k$  Equation 2

The output of the mixer caused by the energy reflected from the moving target is:

$Y_1(t) = A_1 e^{-ik_1 r(t)/2}$ for mixer 1  Equation 3

$Y_2(t) = A_2 e^{-ik_2 r(t)/2}$ for mixer 2  Equation 4

$Y_2(t) = Y_1(t) e^{-i\Delta k r(t)/2}$ obtained by substitution  Equation 5

The above equation predicts waveform $Y_2(t)$ using the difference between $k_1$ and $k_2$ and the range $r(t)$.

Here it can be seen that one can predict the expected temporal phase difference waveform for $f_2$ from the measured phase difference waveform for $f_1$.

By having a predicted waveform for the temporal phase differences of $f_2$, one can compare this waveform with a waveform generated from the measured actual phase differences at $f_2$.

Since the predictor generates predicted waveforms at various ranges, when the waveform generated from measured data is compared with one of the predicted waveforms, a match indicates the range to the moving object.

If the comparison results in a significant disparity between the two waveforms, one can adjust the range input to the predictor to generate another predicted waveform for $f_2$. When this newly generated waveform is compared to the waveform associated with measured data, assuming a closer match, the range associated with the newly generated predicted waveform is determined to be the actual range of the moving object.

It will be appreciated that the phase shift between the waveforms replicates at intervals of $\lambda_d/4$ where in this case $\lambda_d$ is the wavelength of the difference frequency. In general, a difference between $f_1$ and $f_2$ of one MHz corresponds to a $\lambda_d$ of about 300 meters. $\lambda_d/4$ thus corresponds to 75 meters and is termed a "range cell." Returns from moving objects outside of the range cell that would duplicate those inside the range cell can be distinguished in terms of the amplitude of the signals returned from the moving object. Thus a much-decreased amplitude return indicates a moving object in a second or third range cell.

The size of the range cell and thus the resolution of the system is determined by the separation in the two tones. One would normally want to start with a large range cell, in the above example 75 meters, and set the initial range cell by separating the two tones by one MHz.

If movement is ascertained within this relatively large range cell, one may subsequently decide to reduce the size of the range cell to increase resolution. If one sees activity in the larger range cell one can, for instance, increase the separation in the two tones to 3 MHz, which makes the range cells one-third the original size.

Having ascertained the range cell that all activity is in, one can increase the resolution of the subject system by increasing the separation between the two tones to decrease the range cell size and thus increase the resolution.

More particularly, this system detects not only motion in a room but also the range of the moving object. One wants to know and locate where in the building the moving object is. If one is able to measure range, this aids in that process of locating individuals in a room or behind a wall.

In order to provide range, the two-tone radar uses two frequencies that are fairly close together, for instance one megahertz apart. One chooses two close frequencies and then looks at the output of each mixer for both frequency 1 and frequency 2. By using a model that describes the differences in the frequency 1 and frequency 2 outputs, one adjusts the range parameter for the model so that when the difference between the model predictions are minimized based on observed data collected, the range that gives the best or closest agreement corresponds to the range of the moving object.

Thus, at a given distance there is a two-way trip that the signal has to travel, with a phase shift between the transmitted and received signals corresponding to that distance. If the distance changes, the phase shift will change. Since each frequency is slightly different, that phase shift will change a little bit differently for the two frequencies. What the system does is to model the two-way trip for each frequency. One frequency shows how the individual is moving in a non-uniform way and one makes a comparison with the motion of the same individual as detected by the second frequency, assuming that both frequencies monitor the same motion. The only parameter left is the range, and by adjusting range, when the range parameters come to the right value, the models for $f_1$ and $f_2$ will match and that range is a good prediction of the range of the moving object.

Referring now to FIG. 1, in order to detect the presence of an individual 10 constituting a moving object behind a wall 12, a radar 14 is provided, which transmits continuous waves 16 and 18 through a summation device 20 to an antenna 22. Antenna 22 simultaneously projects the two waveforms at $f_1$ and $f_2$ as illustrated at 24 and 26 through wall 12, where they meet object 10 and are reflected backwardly as illustrated at 28 and 30. The phase difference between outgoing and incoming waveforms for each of the frequencies is detected as will be discussed, and in one embodiment the waveform corresponding to the temporal phase difference for tone $f_1$ is coupled to a predictor 32. It is the purpose of predictor 32 to predict the temporal waveform that would be expected to exist for the temporal phase difference waveform at frequency $f_2$ for an object at a known distance or range, with the output of the predictor being a waveform on line 34. In order for predictor 32 to operate, the predictor predicts the $f_2$ waveform for a predetermined range $R_x$ as illustrated at 36, such that for a given input waveform at one frequency, a set of templates at the other frequencies corresponding to predicted waveforms at different ranges constitutes the output of predictor 32.

Predictor 32, upon receiving a waveform input on input line 38, for an initial range generates a predicted waveform for the temporal phase difference for the second tone and applies this waveform to a comparator 40.

As illustrated by arrow 42, measured data in terms of the temporal phase difference waveform for tone $f_2$ is applied to a waveform generator 44. This provides a temporal rendition of the phase difference of the outgoing and incoming waves at frequency $f_2$ from measured data. This waveform is applied on line 46 to comparator 40.

If the waveform on line 34 and the waveform on line 46 are sufficiently similar or agree, then one declares that the range to object 10 is the range that has been loaded into predictor 32 to generate the predicted waveform. This range is outputted at 50 as illustrated.

On the other hand, if there is no significant agreement between the waveforms on lines 34 and 46, then as illustrated at unit 52, the range associated with the predictor 32 is changed and the process is iteratively carried out until there is a sufficient match between the waveforms on lines 34 and 46. When there is such a match, the range that was used in the predictor 32 is the declared range to the moving target.

Figure 2:
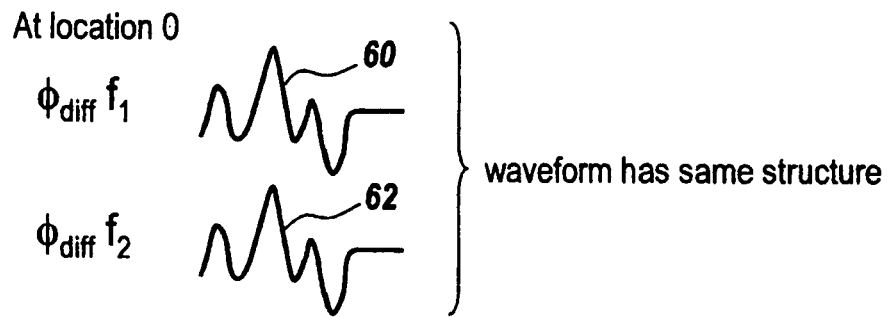
FIG. 2 is a waveform diagram for a pseudo-random moving object behind a wall, showing the phase difference waveforms for the two tones, namely $f_1$ and $f_2$, at a location that is adjacent the antenna of FIG. 1, showing the relative identity of the two waveforms.

Referring to FIG. 2, assuming that one has phase difference waveforms 60 and 62 that are the result of the radiation from antenna 22 impinging up a randomly moving object behind wall 12, then as can be seen, for a location that is adjacent antenna 22, namely at zero distance, the waveforms themselves are very nearly the same.

Figure 3:
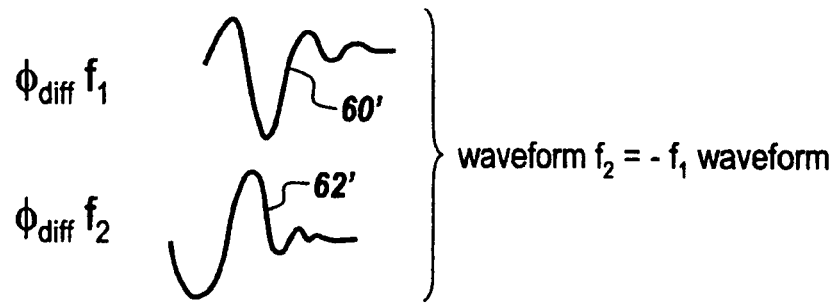
FIG. 3 is a waveform diagram for a pseudo-random moving object behind a wall, showing the phase difference waveforms for the two tones, namely $f_1$ and $f_2$, at a location at a distance from the antenna at which the waveforms are 180° out of phase.

Referring to FIG. 3, if the moving object creating the phase difference in the returns to antenna 22 is at a location that is $\lambda/4$, with $\lambda$ being the wavelength of the tone separation, in one embodiment one MHz, then waveforms 60 and 62 are those as shown as waveforms 60' and 62', which are 180° phase shifted. This means that even for pseudo-random motion that results in non-sinusoidal waveforms 60 and 62, one can nonetheless establish that the distance of the object that is moving in a pseudo-random fashion is at $\lambda/4$ away from antenna 22.

Figure 4:
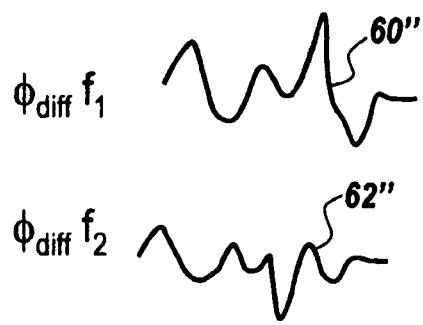
FIG. 4 is a waveform diagram for a pseudo-random moving object behind a wall, showing the waveforms for the two tones, namely $f_1$ and $f_2$, at a location intermediate the zero object position of FIG. 2 and the phase reversal object position of FIG. 3, indicating an offset between the two waveforms associated with a location between phase reversal location and the zero position of the pseudo-random moving object.

Referring to FIG. 4, for waveforms 60" and 62", these waveforms are those that result from a pseudo-random moving object at a range between zero and $\lambda/4$. If it were possible to measure the phase difference between these two non-sinusoidal waveforms, one could ascertain the distance from the antenna and therefore the range.

However, and referring back to FIG. 1, since it is not possible to accurately measure the phase shift of phase difference between waveforms 60" and 62", at least from inspection, one generates a series of waveform templates relating to one of the tones or frequencies that would be expected at one of a plurality of ranges. This waveform is predicted from the measured waveform of the other of the frequencies or tones, with the prediction algorithm being described above.

In this manner, one generates a series of waveform templates at one particular frequency or tone, which is what would be expected at various ranges. This is done by using the waveform associated with the other tone.

Having generated a series of such range-dependent templates, one then seeks to compare a waveform from measured data with the predicted waveform, which his range dependent. One can use any one of a number of curve-matching or best-fit techniques to ascertain to which of the waveform templates the measured data corresponds. When there is a sufficient match, one then declares the range to the moving object to be the range associated with the particular template to which the measured waveform was attached.

Figure 5:
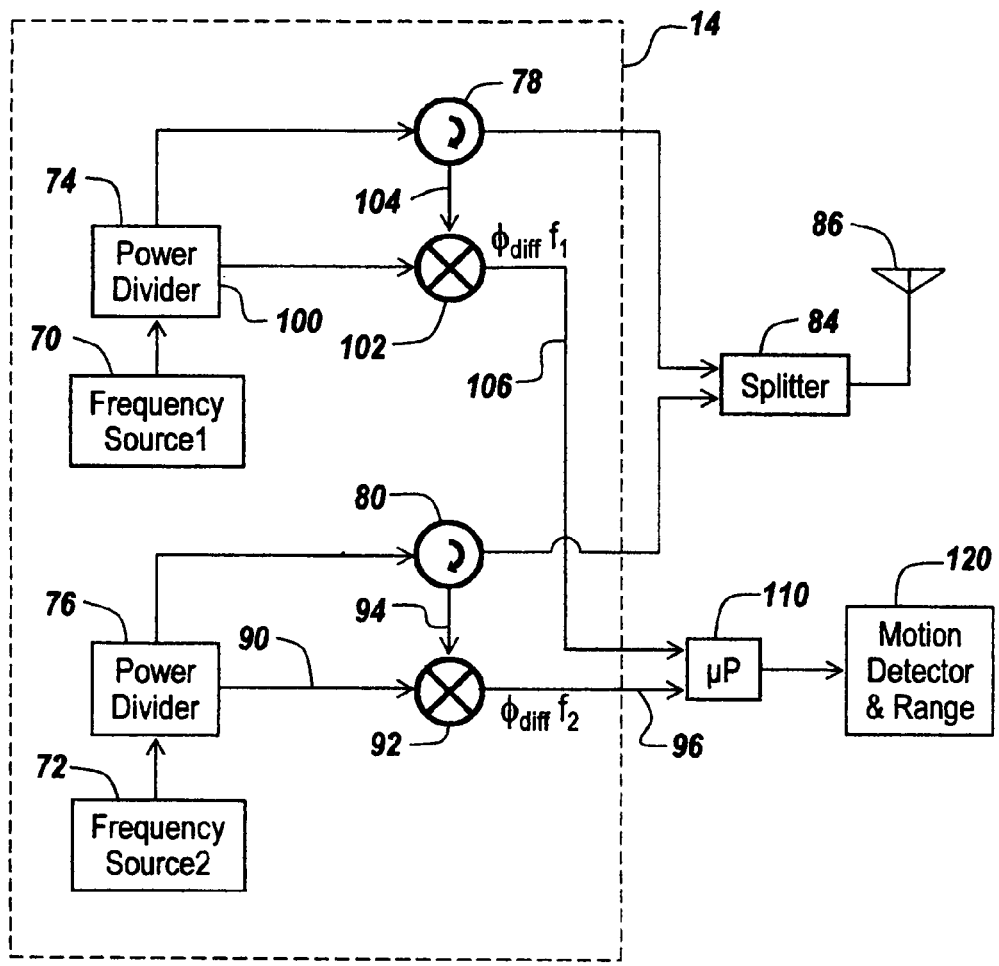
FIG. 5 is a block diagram of a two-tone CW radar for use in the subject invention in which phase difference of the outgoing and incoming signals for each of the two frequencies is detected as the output of respective mixers, with the outputs of the respective mixers being applied to a microprocessor for determining not only the presence of motion but also range to the moving object.

Referring to FIG. 5, apparatus for deriving the temporal phase difference waveforms is shown in terms of a dual frequency radar, although some advantage may be obtained by using more than two different frequencies. However, for the present purposes, radar 14 can be characterized as including a pair of frequency sources 70 and 72 respectively at $f_1$ and $f_2$, each of which driving a power divider respectively 74 and 76, the outputs of which are respectively coupled to circulators 78 and 80, the outputs of which are in turn coupled to a summing or mixing device such as a splitter 84 and thence to an antenna 86.

Power divider 76 provides an output along line 90 to a mixer 92, which mixes it with an output corresponding to the returned signal from a moving object that comes out on line 94. The output of mixer 92 along line 96 is therefore the phase difference between the outgoing and incoming signals at frequency $f_2$.

Likewise, for power divider 74, one output is applied over line 100 to a mixer 102, which has as its other input a signal on line 104 such that the output along line 106 from mixer 102 is a phase difference waveform associated with the phase difference between outgoing and incoming signals associated with $f_1$.

Microprocessor 110 performs the functions of detecting not only motion but the range to the object in motion as described above, with a motion detector and range-determining unit 120 outputting the range to the moving target, be it in continuous motion or pseudo-random motion.

It will be appreciated that microprocessor 110 contains the predictor, comparator and range adjustment functions that are described in connection with FIG. 1.

Figure 6:
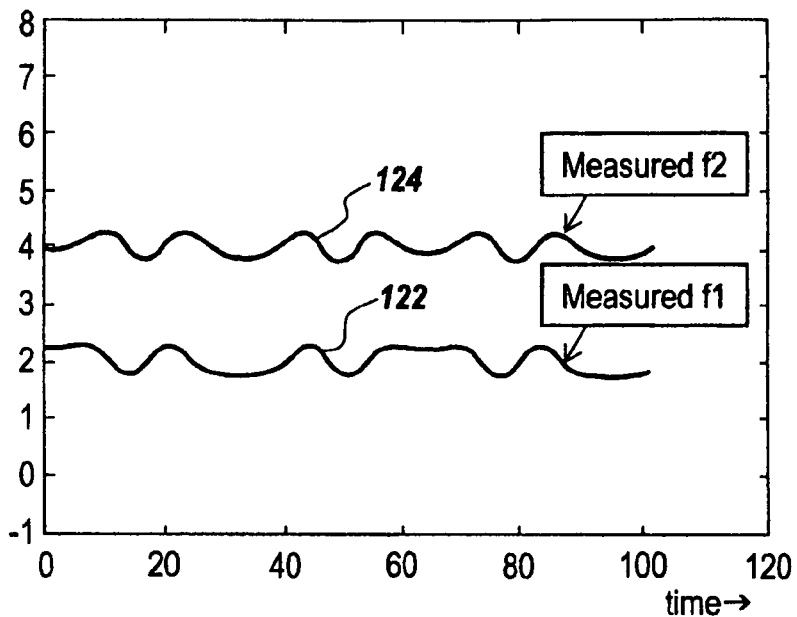
FIG. 6 is a waveform diagram of measured temporal phase differences for the two tones, $f_1$ and $f_2$, showing a difference in the two waveforms.

As illustrated in FIG. 6, the measured phase difference waveforms applied to unit 110 are illustrated at 122 for the first tone or $f_1$ and 124 for the second tone or $f_2$. Here it will be appreciated that for these signals, an object behind wall 12 has reflected the signals such that the phase difference waveforms can be generated. The range at which the object reflects the radar energy is not known and, as can be seen, the phase difference waveforms are slightly different one tone to the other.

Figure 7:
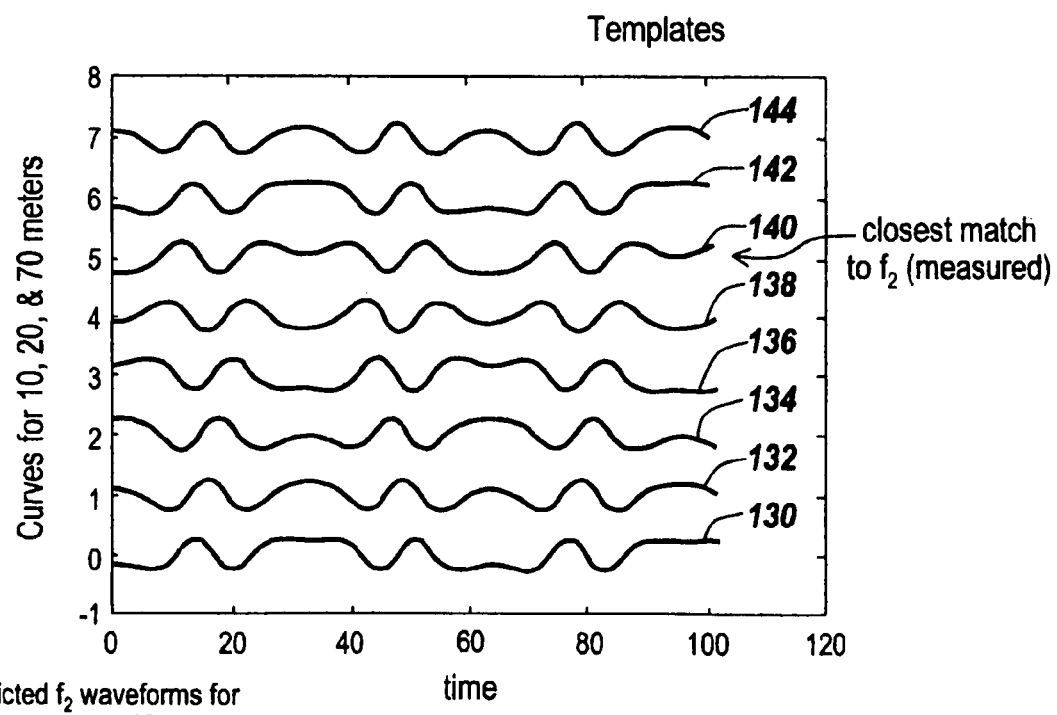
FIG. 7 is a series of projected waveforms for the second of the two frequencies at eight different ranges, with the fifth of the predicted waveforms being the closest match to the measured $f_2$ waveform corresponding to a range of approximately 50 meters.

Referring to FIG. 7, a number of waveforms 130, 132, 134, 136, 138, 140, 142 and 144 constitute a number of templates, with these waveforms being the predicted $f_2$ waveforms for different ranges. In this case the ranges are separated by 10 meters.

If, as is done by unit 110, one compares the measured waveform at $f_2$, namely waveform 122, with each of these templates, one ascertains that the closest match to the measured $f_2$ waveform is waveform 140. This leads to the declaration that the range to the object is 50 meters.

What will be seen, even though the object in question may be exhibiting a pseudo-random motion, and even though this pseudo-random motion produces phase difference waveforms that are non-sinusoidal, one can nevertheless, with waveform matching techniques, determine which of the templates is closest to the measured waveform, whereby range to the object producing this waveform can be readily ascertained with high certainty.

It will be appreciated that if one has multiple two-tone radar units at different positions and if one establishes the range to each of these radars by the techniques described herein, one can establish the position of the moving object by triangulation or other techniques.

As mentioned hereinabove, in order to get an unambiguous range determination, one has to ascertain in which range cell the moving object is. This is simply accomplished by adjusting the frequency separation between the tones to establish a large enough range cell so that one with confidence can ascertain that the moving object is within the range cell. Also, as mentioned before, amplitude-sensitive techniques can determine which range cell the object is in, since the amplitude of returns from objects farther away will be considerably reduced.

Position Determination

What has been described hereinabove is a system for robustly detecting the presence and range of a moving object within a building or behind the walls of a structure in which a multi-tone CW beam is projected through the wall and in which the range of a moving object or individual from this particular radar is determined. How to obtain instantaneous position is now described.

Assuming that one duplicates the radar of FIG. 5 at two locations, here shown at 14 and 14', then one projects RF energy into a surveilled area or region of interest 150 from two different directions, subtended by beam 152 from radar 14 and beam 154 from radar 14' respectively.

The result of using the two-tone system of FIG. 5 is that a band or swath 156 of possible ranges for a moving individual from radar 14 can be generated which locates the moving individual at any given instant of time in the area subtended by Band 1, namely swath 156.

Likewise, swath 158 defines the possible positions of an individual or moving object relative to the second radar, radar 14', such that the swath of ranges is indicated by swath 158 as Band 2.

From this point it is possible to detect the overlap of Band 1 and Band 2 at position 160 to be able to compute the instantaneous position of the moving individual.

The use of multiple multi-tone CW radar range finding systems, each projecting a beam at different angles through the area to be surveilled, provides not only for the range of a moving individual or object from each of the radars but also the overlap provides for the position as well.

The area of overlap 160 is determined by the width of the various swaths, which is in turn determined by the difference in frequencies of the multi-tone radars, it being noted that the range bands can be determined ahead of time as described hereinbefore. The range bands are to occur in the nearest zone to each of the radars such that by projecting RF energy through walls of a building or other structure from two spaced-apart radars, one can triangulate on the position of the moving object or individual.

Figure 9:
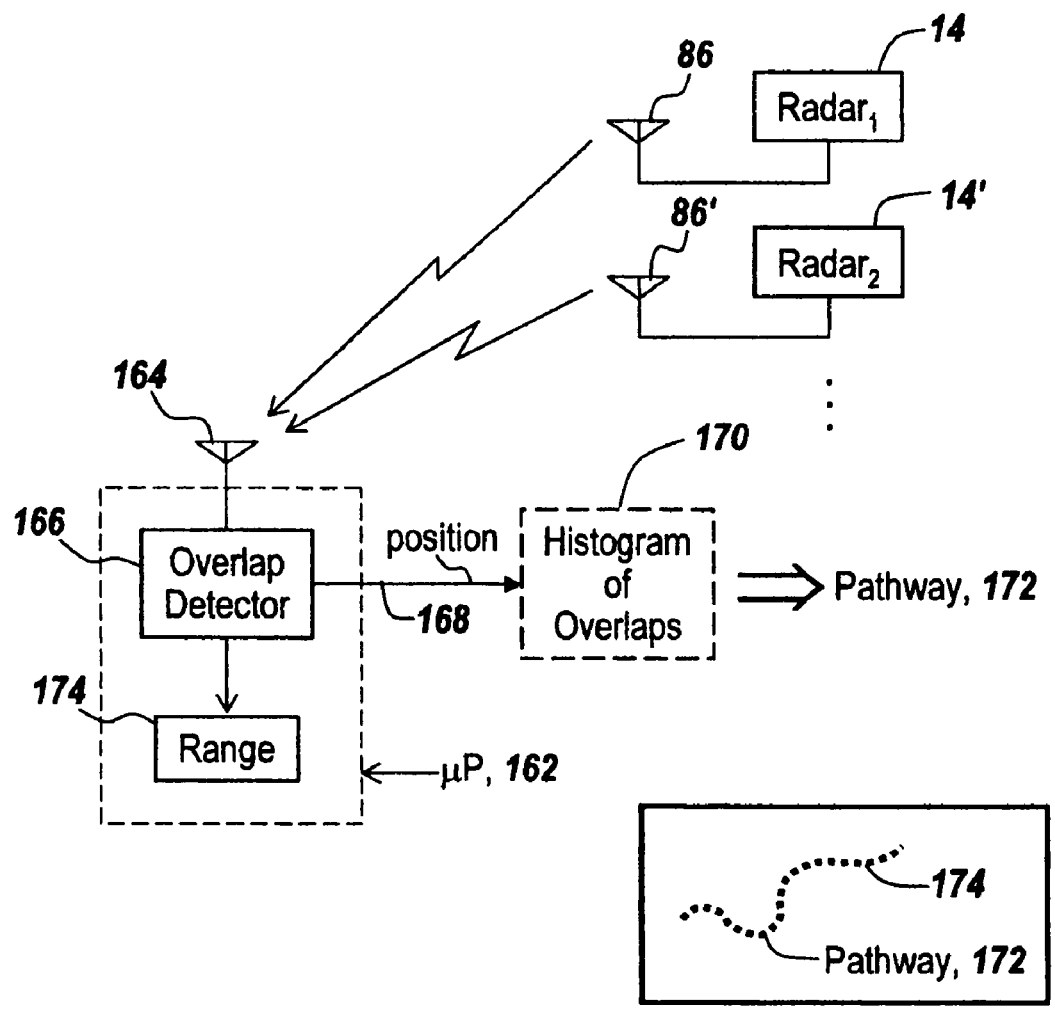

In order to do so and referring now to FIG. 9, it can be seen that radars 14 and 14', while projecting radar signals through a particular wall, also may be used to communicate the results of the radar interrogation by modulating the selfsame signals, which results are picked up at a microprocessor 162 that carries a microwave receiver (not shown).

The signals from antennas 86 and 86' are picked up for this purpose by antenna 164, with the output of the receiver being coupled to an overlap detector 166 that taking the range derived from the two radars and the position of their antennas available over line 167 calculates the overlap area and its position relative to the positions of the two radars used in the through-the-wall sensing system.

Figure 8:
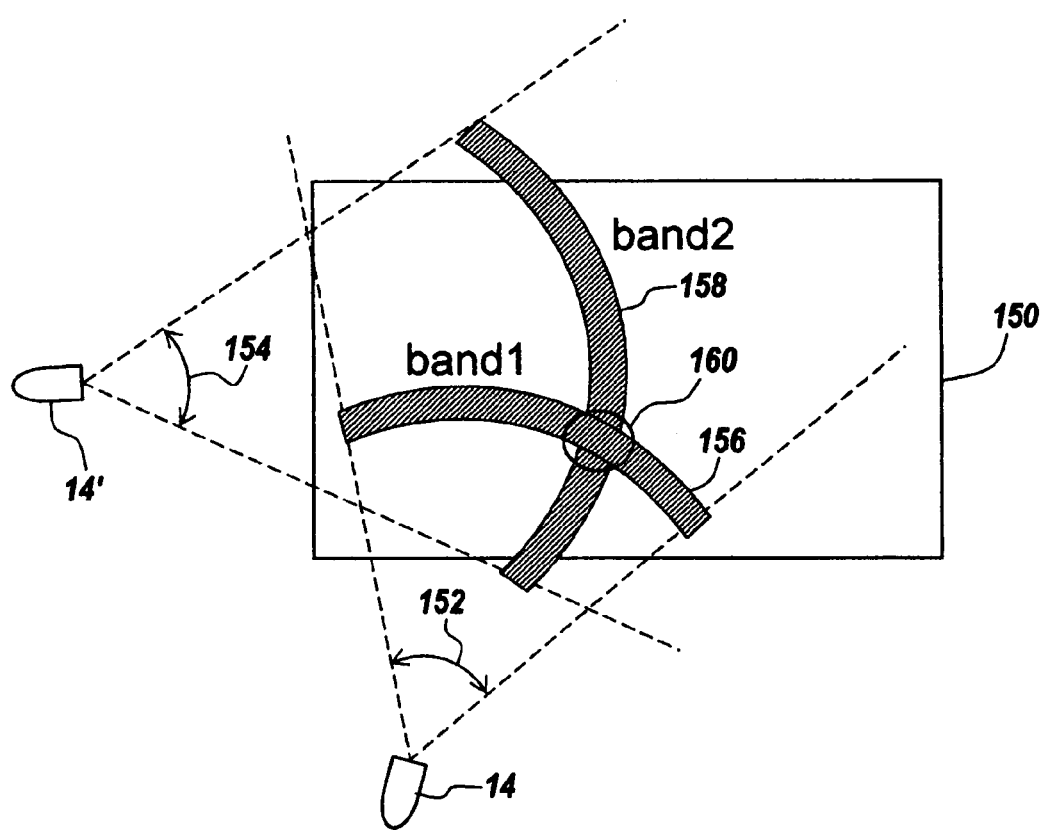
FIG. 8 is a diagrammatic illustration of the intersection of two range bands in a surveilled area from two spaced-apart multi-tone CW radars indicating the beam spread for each of the radars and indicating an intersection area of the range bands or swaths that determine the location of the moving individual within the surveilled area, with two or more range/motion-detecting radars used to obtain position; and, FIG. 9 is a schematic diagram of a system using the multi-tone radars of FIG. 8 in which the radars of FIG. 5 are used not only to emit radar signals but also have signals that are detected back at a microprocessor where an overlap detection is made to determine position, the range being a biproduct, and with a histogram of overlaps or positions being used to generate a pathway display.

The result of the overlap detection at its position is available over line 168, coupled in one embodiment to a histogram 170 that calculates and generates a histogram of overlaps, thus to be able to determine the pathway 172 of the moving object or individual within the surveilled area 150 of FIG. 8.

This pathway, namely pathway 172, is shown by a breadcrumb trail 174 as illustrated to indicate the path of the individual through the area behind a wall through which the RF energy is projected.

It will be appreciated that overlap detector 166 can also provide a range indication 174, which can be used either to indicate the detection of the presence of an individual or for other purposes.

Two or more units can provide ranges to the target. The known locations of the units are used along with the range values to produce a target location. With three units, it is possible to produce a 3D location. It is not required that the beam width of the radar be narrow to get an accurate position. Only the locations of each radar unit need be known. An accurate position can be produced as long as the target is within the beam pattern of each radar.

The algorithm for determining the triangulated position is now presented.

Each dual frequency radar produces a range estimate. The range estimate has an uncertainty that is as a range dependent likelihood function $P(r)$. $P(r)$ defines an arc whose center is located at the position $(x_i, y_i, z_i)$ of the ith radar unit. With two or more radar units a joint likelihood function $L(x,y,z,P(r_i), x_i,y_i,z_i))$ is formed. The target position is obtained by doing a search over $x,y,z$ to find the peak value of $L$. The algorithm to do the search can be based on a number of known methods including gradient search methods.

In operational trials, with a moving object behind a wall and spaced between 10 and 30 meters from the radars, it has been found that the positional accuracy can be as little as one meter in terms of the overlap area of the various range swaths. This is sufficient accuracy to be able to locate a trapped firefighter, a hiding enemy soldier or combatant, or in fact to provide a real-time track of a moving individual behind the wall or building structure.

Other factors for determining positional accuracy are now presented.

Tests were conducted using two radars. Best results were obtained when the target was located such that the centerlines of each beam were perpendicular to each other. In this case a 2D location can be produced to an accuracy of DR in each direction. DR is the accuracy that a single radar can measure range and is roughly 1 meter at ranges of up to 20 meters for the test unit. As the angle is reduced to less than 90°, the accuracy degrades as $1/\mathrm{Cos}(theta)$ in the cross range direction.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for ascertaining the position of a moving object behind a wall, comprising the steps of:

positioning at least two through-the-wall CW multi-tone radars at different known widely spaced-apart positions with respect to the wall such that radar beams cross and penetrate the area behind the wall, the spacing of the radars being such as to have no established phase relationship between the outputs thereof;

determining range to the moving object from each of the radars using the multi-tone returns from the moving object and a background subtraction technique involving detection of changes in range due to a moving object to establish the locus of ranges within the beam of each radar, thus to determine range in terms of a range swath, the range-determining step including the step of comparing the range results at one frequency with predicted range results from another frequency to determine the most accurate range; and, ascertaining the location of the crossed-beam overlap of the swaths to obtain the position of the moving object by triangulation without using phase measuring techniques.

2. The method of claim 1, and further including the steps of generating a histogram of swath overlap locations, so as to provide a track of the instantaneous locations of the moving object; and, generating an indication of the track.

3. The method of claim 1, wherein the range-determining step includes the steps of generating a set of templates for a set of range swaths and matching returns from the multi-tone radars with the templates to determine by the closest match the corresponding range swath.

4. The method of claim 1, wherein the frequency offset between tones defines range cell accuracy, and wherein the smaller the offset, the higher the resolution.

5. The method of claim 4, wherein the frequency offset is variable to vary the dimensions of the range cell.

6. The method of claim 1, wherein the multi-tone radars detect the phase difference between outgoing and reflected waves to establish respective temporal waveforms and wherein range estimates are based on the relative relationship between waveforms.

7. The method of claim 1, wherein range is estimated by each radar that includes from waveforms associated with a first tone generating a set of range-dependent waveform templates corresponding to a second tone and comparing a waveform at the second tone derived from measured data with each of the range-dependent templates to ascertain by matching techniques which template is closest, thus to estimate the range to the moving object when the object is moving in a non-uniform manner.

8. Apparatus for ascertaining the position of a moving object behind a wall, comprising:
at least two through-the-wall CW multi-tone radars placed at different known positions with respect to said wall such that radar beams cross and penetrate the area behind said wall;
means in each of said radars for determining range to said moving object using the multi-tone returns from said moving object so as to ascertain a locus of ranges within the beam of each radar, thus to determine range in terms of a range swath; and,
an overlap detector for ascertaining the location of the crossed-beam overlap of said swaths to obtain the position of said moving object.

9. The apparatus of claim 8, and further including:
a processor for generating a histogram of swath overlap locations, so as to provide a track of the instantaneous locations of said moving object; and,
a display for generating an indication of said track.

10. The apparatus of claim 8, wherein said range-determining means includes a set of templates for a set of range swaths and a processor for matching returns from the radars with the templates to determine by the closest match the corresponding range swath.

11. The apparatus of claim 8, wherein the frequency offset between tones defines range cell accuracy, and wherein the smaller the offset, the higher the resolution.

12. The apparatus of claim 11, wherein said frequency offset is variable to vary the dimensions of said range cell.

13. The apparatus of claim 8, wherein said multi-tone radars detect the phase difference between outgoing and reflected waves to establish respective temporal waveforms and wherein range estimates are based on the relative relationship between said waveforms.

14. The apparatus of claim 8, wherein each of said radars estimates range that includes from waveforms associated with a first tone means for generating a set of range-dependent waveform templates corresponding to a second tone and a processor for comparing a waveform at the second tone derived from measured data with each of the range-dependent templates to ascertain by matching techniques which template is closest, thus to estimate the range to said moving object when said object is moving in a non-uniform manner.

15. A method of ascertaining the whereabouts of an enemy soldier or combatant behind a building wall or structure so as to be able to locate the position of the enemy soldier or combatant and direct fire to his or her position, comprising the steps of:
deploying at least two through-the-wall CW multi-tone radars in the vicinity of the building wall or structure behind which the enemy soldier or combatant is assumed to be located, with the beams from the radars being crossed;
determining the existence of and range to any moving object behind the building wall or structure from each of the radars using the multi-tone returns from the moving object so as to ascertain a range swath of possible locations of the moving object from each of the radars; and,
ascertaining the location of the crossed-beam overlap of the swaths to obtain the position of the detected moving object without using phase measuring techniques, whereby ordnances may be aimed at the ascertained location.

16. The method of claim 15, and further including the steps of
generating a histogram of swath overlap locations, so as to provide a track of the instantaneous locations of the moving object; and,
generating an indication of the track.

17. The method of claim 15, wherein the range-determining step includes the steps of generating a set of templates for a set of range swaths and matching returns from the radars with the templates to determine by the closest match the corresponding range swath.

18. A method for ascertaining the position of a moving object behind a wall, comprising the steps of:
positioning at least two through-the-wall CW multi-tone radars at different known positions with respect to the wall such that radar beams cross and penetrate the area behind the wall;
determining range to the moving object from each of the radars using the multi-tone returns from the moving object and a background subtraction technique involving detection of changes in range due to a moving object to establish the locus of ranges within the beam of each radar, thus to determine range in terms of a range swath, the range-determining step including the steps of generating a set of templates for a set of range swaths and matching returns from the multi-tone radars with the templates to determine by the closest match the corresponding range swath; and,
ascertaining the location of the crossed-beam overlap of the swaths to obtain the position of the moving object by triangulation.

19. Apparatus for ascertaining the position of a moving object behind a wall, comprising:
at least two through-the-wall CW multi-tone radars placed at different known positions with respect to said wall such that radar beams cross and penetrate the area behind said wall;

means in each of said radars for determining range to said moving object using the multi-tone returns from said moving object so as to ascertain a locus of ranges within the beam of each radar, thus to determine range in terms of a range swath, said range-determining means including a set of templates for a set of range swaths and a processor for matching returns from the radars with the templates to determine by the closest match the corresponding range swath; and, an overlap detector for ascertaining the location of the crossed-beam overlap of said swaths to obtain the position of said moving object without using phase measuring techniques.

20. A method of ascertaining the whereabouts of an enemy soldier or combatant behind a building wall or structure so as to be able to locate the position of the enemy soldier or combatant and direct fire to his or her position, comprising the steps of:

deploying at least two through-the-wall CW multi-tone radars in the vicinity of the building wall or structure behind which the enemy soldier or combatant is assumed to be located, with the beams from the radars being crossed;

determining the existence of and range to any moving object behind the building wall or structure from each of the radars using the multi-tone returns from the moving object so as to ascertain a range swath of possible locations of the moving object from each of the radars, the range-determining step including the steps of generating a set of templates for a set of range swaths and matching returns from the radars with the templates to determine by the closest match the corresponding range swath; and, ascertaining the location of the crossed-beam overlap of the swaths to obtain the position of the detected moving object without using phase measuring techniques, whereby ordnances may be aimed at the ascertained location.

* * * * *